US012387737B2

(12) United States Patent
Gao et al.

(10) Patent No.: US 12,387,737 B2
(45) **Date of Patent: *Aug. 12, 2025**

(54) VERY SHORT PITCH DETECTION AND CODING

(71) Applicant: Huawei Technologies Co., Ltd., Shenzhen (CN)

(72) Inventors: Yang Gao, Mission Viejo, CA (US); Fengyan Qi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,067

(22) Filed: Dec. 29, 2023

(65) Prior Publication Data

US 2024/0221766 A1 Jul. 4, 2024

Related U.S. Application Data

(63) Continuation of application No. 17/667,891, filed on Feb. 9, 2022, now Pat. No. 11,894,007, which is a (Continued)

(51) Int. Cl.
*G10L 19/00* (2013.01)
*G10L 21/003* (2013.01)
(Continued)

(52) U.S. Cl.
CPC ............ *G10L 21/003* (2013.01); *G10L 19/00* (2013.01); *G10L 25/06* (2013.01); *G10L 25/21* (2013.01); *G10L 25/90* (2013.01); *G10L 19/09* (2013.01)

(58) Field of Classification Search
CPC ................................ G10L 19/08; G10L 25/90
See application file for complete search history.

(56) References Cited

U.S. PATENT DOCUMENTS 4,809,334 A 2/1989 Bhaskar
5,104,813 A 4/1992 Besemer et al.
(Continued)

FOREIGN PATENT DOCUMENTS

CN 101183526 A 5/2008
CN 101286319 A 10/2008
(Continued)

OTHER PUBLICATIONS

Wong, A., et al., "Partitioning Microfluidic Channels with Hydrogel to Construct Tunable 3-D Cellular Microenvironments," Biomaterials, vol. 29, No. 12, Apr. 2008, pp. 1853-1861.
(Continued)

*Primary Examiner* — Daniel Abebe
(74) *Attorney, Agent, or Firm* — Conley Rose, P.C.

(57) ABSTRACT

A method includes detecting whether there is a very short pitch lag in a speech or audio signal that is shorter than a conventional minimum pitch limitation using a combination of time domain and frequency domain pitch detection techniques. The pitch detection techniques include using pitch correlations in a time domain and detecting a lack of low frequency energy in the speech or audio signal in a frequency domain. The detected very short pitch lag is coded using a pitch range from a predetermined minimum very short pitch limitation that is smaller than the conventional minimum pitch limitation.

21 Claims, 9 Drawing Sheets

Related U.S. Application Data continuation of application No. 16/668,956, filed on Oct. 30, 2019, now Pat. No. 11,270,716, which is a continuation of application No. 15/662,302, filed on Jul. 28, 2017, now Pat. No. 10,482,892, which is a continuation of application No. 14/744,452, filed on Jun. 19, 2015, now Pat. No. 9,741,357, which is a continuation of application No. 13/724,769, filed on Dec. 21, 2012, now Pat. No. 9,099,099.

(60) Provisional application No. 61/578,398, filed on Dec. 21, 2011.

(51) Int. Cl.

| | |
|---|---|
| ***G10L 25/06*** | (2013.01) |
| ***G10L 25/21*** | (2013.01) |
| ***G10L 25/90*** | (2013.01) |
| *G10L 19/09* | (2013.01) |

(56) References Cited

U.S. PATENT DOCUMENTS

| | | | |
|---|---|---|---|
| 5,127,053 | A | 6/1992 | Koch |
| 5,495,555 | A | 2/1996 | Swaminathan |
| 5,774,836 | A | 6/1998 | Bartkowiak et al. |
| 5,864,795 | A | 1/1999 | Bartkowiak |
| 5,960,386 | A | 9/1999 | Janiszewski et al. |
| 6,052,661 | A | 4/2000 | Yamaura et al. |
| 6,074,869 | A | 6/2000 | Pall et al. |
| 6,108,621 | A | 8/2000 | Nishiguchi et al. |
| 6,330,533 | B2 | 12/2001 | Su et al. |
| 6,345,248 | B1 | 2/2002 | Su et al. |
| 6,418,405 | B1 | 7/2002 | Yeldener |
| 6,438,517 | B1 | 8/2002 | Yeldener |
| 6,456,965 | B1 | 9/2002 | Yeldener |
| 6,463,406 | B1 | 10/2002 | McCree |
| 6,470,311 | B1 | 10/2002 | Moncur |
| 6,507,814 | B1 * | 1/2003 | Gao ........................ G10L 19/09 704/E19.041 |
| 6,558,665 | B1 | 5/2003 | Cohen et al. |
| 6,574,593 | B1 | 6/2003 | Gao et al. |
| 6,687,666 | B2 | 2/2004 | Ehara et al. |
| 7,272,556 | B1 * | 9/2007 | Aguilar ................. G10L 19/002 704/226 |
| 7,359,854 | B2 | 4/2008 | Nilsson et al. |
| 7,419,822 | B2 | 9/2008 | Jeon et al. |
| 7,521,622 | B1 | 4/2009 | Zhang |
| 7,972,561 | B2 | 7/2011 | Viovy et al. |
| 8,220,494 | B2 | 7/2012 | Studer et al. |
| 8,812,306 | B2 | 8/2014 | Kawashima et al. |
| 9,070,364 | B2 | 6/2015 | Oh et al. |
| 9,129,590 | B2 | 9/2015 | Kawashima et al. |
| 9,418,671 | B2 | 8/2016 | Gao |
| 2001/0029447 | A1 | 10/2001 | Brandel et al. |
| 2002/0155032 | A1 | 10/2002 | Liu et al. |
| 2003/0200092 | A1 | 10/2003 | Gao et al. |
| 2004/0030545 | A1 | 2/2004 | Sato et al. |
| 2004/0133424 | A1 | 7/2004 | Ealey et al. |
| 2004/0158462 | A1 | 8/2004 | Rutledge et al. |
| 2004/0159220 | A1 | 8/2004 | Jung et al. |
| 2004/0167773 | A1 | 8/2004 | Sorin |
| 2005/0150766 | A1 | 7/2005 | Manz et al. |
| 2005/0267742 | A1 | 12/2005 | Makinen et al. |
| 2007/0154355 | A1 | 7/2007 | Berndt et al. |
| 2007/0288232 | A1 | 12/2007 | Kim |
| 2008/0091418 | A1 | 4/2008 | Laaksonen et al. |
| 2008/0288246 | A1 | 11/2008 | Su et al. |
| 2009/0319261 | A1 | 12/2009 | Gupta et al. |
| 2010/0017453 | A1 | 1/2010 | Held et al. |
| 2010/0049509 | A1 | 2/2010 | Kawashima et al. |
| 2010/0063804 | A1 | 3/2010 | Sato et al. |
| 2010/0070270 | A1 | 3/2010 | Gao |
| 2010/0169084 | A1 | 7/2010 | Gao |
| 2010/0174534 | A1 | 7/2010 | Vos |
| 2010/0200400 | A1 | 8/2010 | Revol-Cavalier |
| 2010/0323652 | A1 | 12/2010 | Visser et al. |
| 2011/0044864 | A1 | 2/2011 | Kawazoe et al. |
| 2011/0100472 | A1 | 5/2011 | Juncker et al. |
| 2011/0125505 | A1 | 5/2011 | Vaillancourt et al. |
| 2011/0153335 | A1 | 6/2011 | Oh et al. |
| 2011/0189786 | A1 | 8/2011 | Vaillancourt et al. |
| 2011/0206558 | A1 | 8/2011 | Kawazoe et al. |
| 2012/0265525 | A1 | 10/2012 | Moriya et al. |
| 2013/0166288 | A1 | 6/2013 | Gao et al. |

FOREIGN PATENT DOCUMENTS

| | | | | |
|---|---|---|---|---|
| CN | 101379551 | A | 3/2009 | |
| CN | 101622664 | A | 1/2010 | |
| CN | 104115220 | B | 6/2017 | |
| CN | 107293311 | A | 10/2017 | |
| DE | 1029746 | A1 | 4/1992 | |
| EP | 1628769 | A1 | 3/2006 | |
| FR | 2942041 | A1 | 8/2010 | |
| JP | 2013137574 | A | 7/2013 | |
| WO | WO-9727578 | A1 * | 7/1997 | ............. G10L 19/12 |
| WO | 0113360 | A1 | 2/2001 | |
| WO | 0245842 | A1 | 6/2002 | |
| WO | 2010017578 | A1 | 2/2010 | |
| WO | 2010111265 | A1 | 9/2010 | |

OTHER PUBLICATIONS

Oh, K., et al., "Topical Review: A Review of Microvalves," XP020105009, Journal of Micromechanics and Microengineering, vol. 16, No. 5, May 2006, pp. R13-R39.

Hasselbrink, E., et al., "High-Pressure Microfluidic Control in Lab-on-a-Chip Devices Using Mobile Polymer Monoliths," Analytical Chemistry, vol. 74, No. 19, Aug. 29, 2002, pp. 4913-4918.

Lagally, E., et al., "Monolithic intergrated microfluidic DNA amplification and capillary electrophoresis analysis system," Sensors and Actuators B: Chemicals, vol. 63, No. 3, May 2000, pp. 138-146.

Hulme, et al., "Incorporation of prefabricated screw, pneumatic, and solenoid valves intro microfluidic devices," Lab on a Chip, vol. 9, No. 1, Jan. 7, 2009, pp. 79-86.

Huebner, et al., "Static Microdroplet Arrays: A Microfluidic Device for Droplet Trapping, Incubation and Release for Enzymatic and Cell-Based Assays," vol. 9, No. 5, Mar. 7, 2009, pp. 692-698.

Verma, M., et al., "Embedded Template-Assisted Fabrication of Complex Microchannels in PDMS and Design of a Microfluidic Adhesive," Langmuir, vol. 22, No. 24, Oct. 28, 2006, pp. 10291-10295.

Reches et al., "Thread as a Matrix for Biomedical Assays," ACS Applied Materials and Interfaces, American Chemical Society, vol. 2, No. 6, May 24, 2010, pp. 1722-1728.

Reches et al., "S1 Supporting Information Thread as a Matrix for Biomedical Assays," XP055305566, ACS Applied Materials and Interfaces, May 24, 2010, pp. S1-S14.

ITU-T G.718, Telecommunication Standardization Sector of ITU, Series G: Transmission Systems and Media, Digital Systems and Networks, Digital terminal equipments—Coding of voice and audiosignals, Frame error robust narrow-band and wideband embedded variable bit-rate coding of speech and audio from 8-32 kbit/s, Jun. 2008, 257 pages.

ITU-T G.718, Amendment 2, Telecommunication Standardization Sector of ITU, Series G: Transmission Systems and Media, Digital Systems and Networks, Digital terminal equipments—Coding of voice and audio signals, Frame error robust narrow-band and wideband embedded variable bit-rate coding of speech and audio from 8-32 kbit/s, Amendment 2: New Annex B on superwideband scalable extension for ITU-T G.718 and corrections to main body fixed-point C-code and description text, Mar. 2010, 60 pages.

AV McCree, et al., "Improving the Performance of a Mixed Excitation LPC Vocoder in Acoustic Noise," IEEE, International Conference on Acoustics, Speech, and Signal Processing, Mar. 23-26, 1992, pp. 137-140.

(56) References Cited

OTHER PUBLICATIONS

S. Yeldener, et al., "Multiband Linear Predictive Speech Coding at Very Low Bit Rates," IEEE Proceedings—Vision, Image and Signal Process, vol. 141, No. 5, Oct. 1994, pp. 289-296.
A Kondoz, et al., "The Turkish Narrow Band Voice Coding and Noise Pre-Processing NATO Candidates," TO IST Symposium on New Information Processing Techniques for Military Systems, Oct. 9-11, 2000, 7 pages.
3GPP2 C.S0052-0 Version 1.0, Source-Controlled Variable-Rate Multimode Wideband Speech Codec (VMR-WB), Service Option 62 for Spread Spectrum Systems, Jun. 11, 2004, 164 pages.
Jelinek, M., "Wideband Speech Coding Advances in VMR-WB Standard," IEEE Transactions on Audio, Speech and Language Processing, vol. 15, No. 4, May 2007, pp. 1167-1179.
Serizawa M., et al., "4KBPS Improved Pitch Prediction CELP Speech Coding with 20ms Frame," International Conference on Acoustics, Speech, and Signal Processing, May 9-12, 1995, 4 pages.
Chahine, G., "Pitch Modeling for Speech Coding at 4.8 kbits/s," A thesis submitted to the Faculty of Graduate Studies and Research in partial fulfilment of the requirements for the degree of Master of Engineering, department of Electrical Engineering McGill University, Jul. 1993, 105 pages.
Kabal, P., et al., "Synthesis Filter Optimization and Coding: Applications to Celp," International Conference on Acoustics, Speech, and Signal Processing, Apr. 11-14, 1988, pp. 147-150.
Zhao, et al., "Lab on a Chip," DOI 10.1039/C3LC5106.
http://en.wikipedia.org/wiki/knitting_machine.
http://en.wikipedia.org/wiki/list_of_knitting_stiches.
http://www.apparelsearch.com/fibers/htm.
http://en.wikipedia.org/wiki/List_of_textile_fibers.
http://en.wikipedia.org/wiki/List_of_fabric_names.
http://en.wikipedia.org/wiki/Category:Technical_fabrics.
http://en.wikipedia.org/wiki/Loom.

* cited by examiner

Example of a regular wideband spectrum with doubling pitch lag coding

VERY SHORT PITCH DETECTION AND CODING

CROSS-REFERENCE TO RELATED APPLICATIONS

This is a continuation of U.S. patent application Ser. No. 17/667,891, filed on Feb. 9, 2022, which is a continuation of U.S. patent application Ser. No. 16/668,956, filed on Oct. 30, 2019, now U.S. Pat. No. 11,270,716, which is a continuation of U.S. patent application Ser. No. 15/662,302, filed on Jul. 28, 2017, now U.S. Pat. No. 10,482,892, which is a continuation of U.S. patent application Ser. No. 14/744,452, filed on Jun. 19, 2015, now U.S. Pat. No. 9,741,357, which is a continuation of U.S. patent application Ser. No. 13/724,769, filed on Dec. 21, 2012, now U.S. Pat. No. 9,099,099, which claims priority to U.S. Provisional Application No. 61/578,398 filed on Dec. 21, 2011. All of the aforementioned patent applications are hereby incorporated by reference in their entireties.

TECHNICAL FIELD

The present disclosure relates generally to the field of signal coding and, in particular embodiments, to a system and method for very short pitch detection and coding.

BACKGROUND

Traditionally, parametric speech coding methods make use of the redundancy inherent in the speech signal to reduce the amount of information to be sent and to estimate the parameters of speech samples of a signal at short intervals. This redundancy can arise from the repetition of speech wave shapes at a quasi-periodic rate and the slow changing spectral envelop of speech signal. The redundancy of speech wave forms may be considered with respect to different types of speech signal, such as voiced and unvoiced. For voiced speech, the speech signal is substantially periodic. However, this periodicity may vary over the duration of a speech segment, and the shape of the periodic wave may change gradually from segment to segment. A low bit rate speech coding could significantly benefit from exploring such periodicity. The voiced speech period is also called pitch, and pitch prediction is often named Long-Term Prediction (LTP). As for unvoiced speech, the signal is more like a random noise and has a smaller amount of predictability.

SUMMARY

In accordance with an embodiment, a method for very short pitch detection and coding implemented by an apparatus for speech or audio coding includes detecting in a speech or audio signal a very short pitch lag shorter than a conventional minimum pitch limitation, using a combination of time domain and frequency domain pitch detection techniques including using pitch correlation and detecting a lack of low frequency energy. The method further includes coding the very short pitch lag for the speech or audio signal in a range from a minimum very short pitch limitation to the conventional minimum pitch limitation, wherein the minimum very short pitch limitation is predetermined and is smaller than the conventional minimum pitch limitation.

In accordance with another embodiment, a method for very short pitch detection and coding implemented by an apparatus for speech or audio coding includes detecting in time domain a very short pitch lag of a speech or audio signal shorter than a conventional minimum pitch limitation using pitch correlations, further detecting the existence of the very short pitch lag in frequency domain by detecting a lack of low frequency energy in the speech or audio signal, and coding the very short pitch lag for the speech or audio signal using a pitch range from a predetermined minimum very short pitch limitation that is smaller than the conventional minimum pitch limitation.

In yet another embodiment, an apparatus that supports very short pitch detection and coding for speech or audio coding includes a processor and a computer readable storage medium storing programming for execution by the processor. The programming including instructions to detect in a speech signal a very short pitch lag shorter than a conventional minimum pitch limitation using a combination of time domain and frequency domain pitch detection techniques including using pitch correlation and detecting a lack of low frequency energy, and code the very short pitch lag for the speech signal in a range from a minimum very short pitch limitation to the conventional minimum pitch limitation, wherein the minimum very short pitch limitation is predetermined and is smaller than the conventional minimum pitch limitation.

BRIEF DESCRIPTION OF THE DRAWINGS

For a more complete understanding of the present disclosure, and the advantages thereof, reference is now made to the following descriptions taken in conjunction with the accompanying drawing.

DETAILED DESCRIPTION

The making and using of the presently preferred embodiments are discussed in detail below. It should be appreciated, however, that the present disclosure provides many applicable concepts that can be embodied in a wide variety of specific contexts. The specific embodiments discussed are merely illustrative of specific ways to make and use the disclosure, and do not limit the scope of the disclosure.

For either voiced or unvoiced speech case, parametric coding may be used to reduce the redundancy of the speech segments by separating the excitation component of speech signal from the spectral envelop component. The slowly changing spectral envelope can be represented by Linear Prediction Coding (LPC), also called Short-Term Prediction (STP). A low bit rate speech coding could also benefit from exploring such a STP. The coding advantage arises from the slow rate at which the parameters change. Further, the voice signal parameters may not be significantly different from the values held within few milliseconds. At the sampling rate of 8 kilohertz (kHz), 12.8 kHz or 16 kHz, the speech coding algorithm is such that the nominal frame duration is in the range of ten to thirty milliseconds. A frame duration of twenty milliseconds may be a common choice. In more recent well-known standards, such as G.723.1, G.729, G.718, EFR, SMV, AMR, VMR-WB or AMR-WB, a CELP has been adopted. CELP is a technical combination of Coded Excitation, Long-Term Prediction and STP. CELP Speech Coding is a very popular algorithm principle in speech compression area although the details of CELP for different codec could be significantly different.

Figure 1:
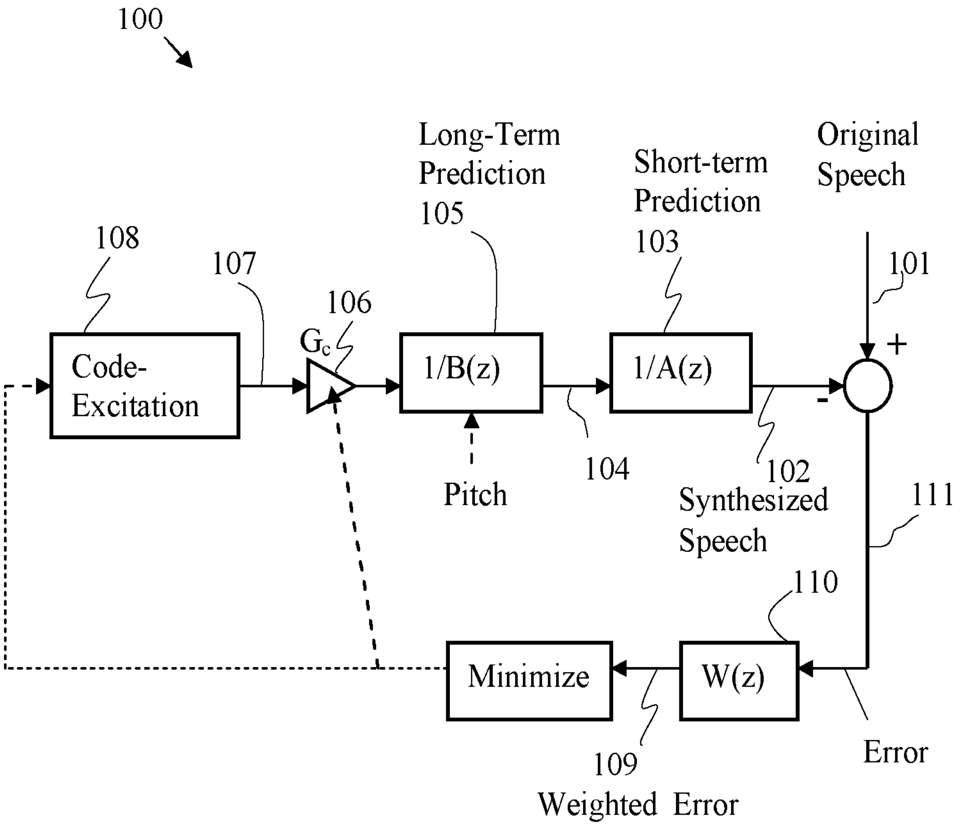
FIG. 1 is a block diagram of a Code Excited Linear Prediction Technique (CELP) encoder.

FIG. 1 shows an example of a CELP encoder 100, where a weighted error 109 between a synthesized speech signal 102 and an original speech signal 101 may be minimized using an analysis-by-synthesis approach. The CELP encoder 100 performs different operations or functions. The function W(z) corresponds is achieved by an error weighting filter 110. The function 1/B(z) is achieved by a long-term linear prediction filter 105. The function 1/A(z) is achieved by a short-term linear prediction filter 103. A coded excitation 107 from a coded excitation block 108, which is also called fixed codebook excitation, is scaled by a gain $G_c$ 106 before passing through the subsequent filters. A short-term linear prediction filter 103 is implemented by analyzing the original signal 101 and represented by a set of coefficients.

$$A(z) = \sum_{i=1}^{P} 1 + a_i \cdot z^{-i},\ i = 1, 2, \ldots , P \tag{1}$$

The error weighting filter 110 is related to the above short-term linear prediction filter function. A typical form of the weighting filter function could be $$W(z) = \frac{A(z/\alpha)}{1-\beta\cdot z^{-1}}, \tag{2}$$

where β<α, 0<β<1, and 0<α≤1. The long-term linear prediction filter 105 depends on signal pitch and pitch gain. A pitch can be estimated from the original signal, residual signal, or weighted original signal. The long-term linear prediction filter function can be expressed as $$W(z) = \frac{A(z/\alpha)}{1-\beta\cdot z^{-1}}, \tag{3}$$

The coded excitation 107 from the coded excitation block 108 may consist of pulse-like signals or noise-like signals, which are mathematically constructed or saved in a codebook. A coded excitation index, quantized gain index, quantized long-term prediction parameter index, and quantized STP parameter index may be transmitted from the encoder 100 to a decoder.

Figure 2:
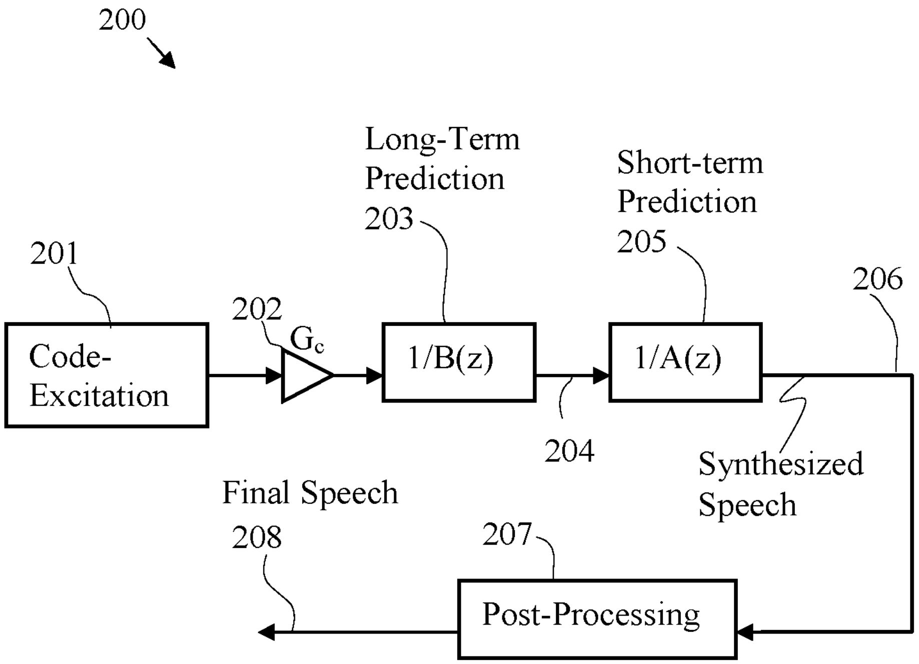
FIG. 2 is a block diagram of a decoder corresponding to the CELP encoder of FIG. 1.

FIG. 2 shows an example of a decoder 200, which may receive signals from the encoder 100. The decoder 200 includes a post-processing block 207 that outputs a synthesized speech signal 206. The decoder 200 comprises a combination of multiple blocks, including a coded excitation block 201, a long-term linear prediction filter 203, a short-term linear prediction filter 205, and a post-processing block 207. The blocks of the decoder 200 are configured similar to the corresponding blocks of the encoder 100. The post-processing block 207 may comprise short-term post-processing and long-term post-processing functions.

Figure 3:
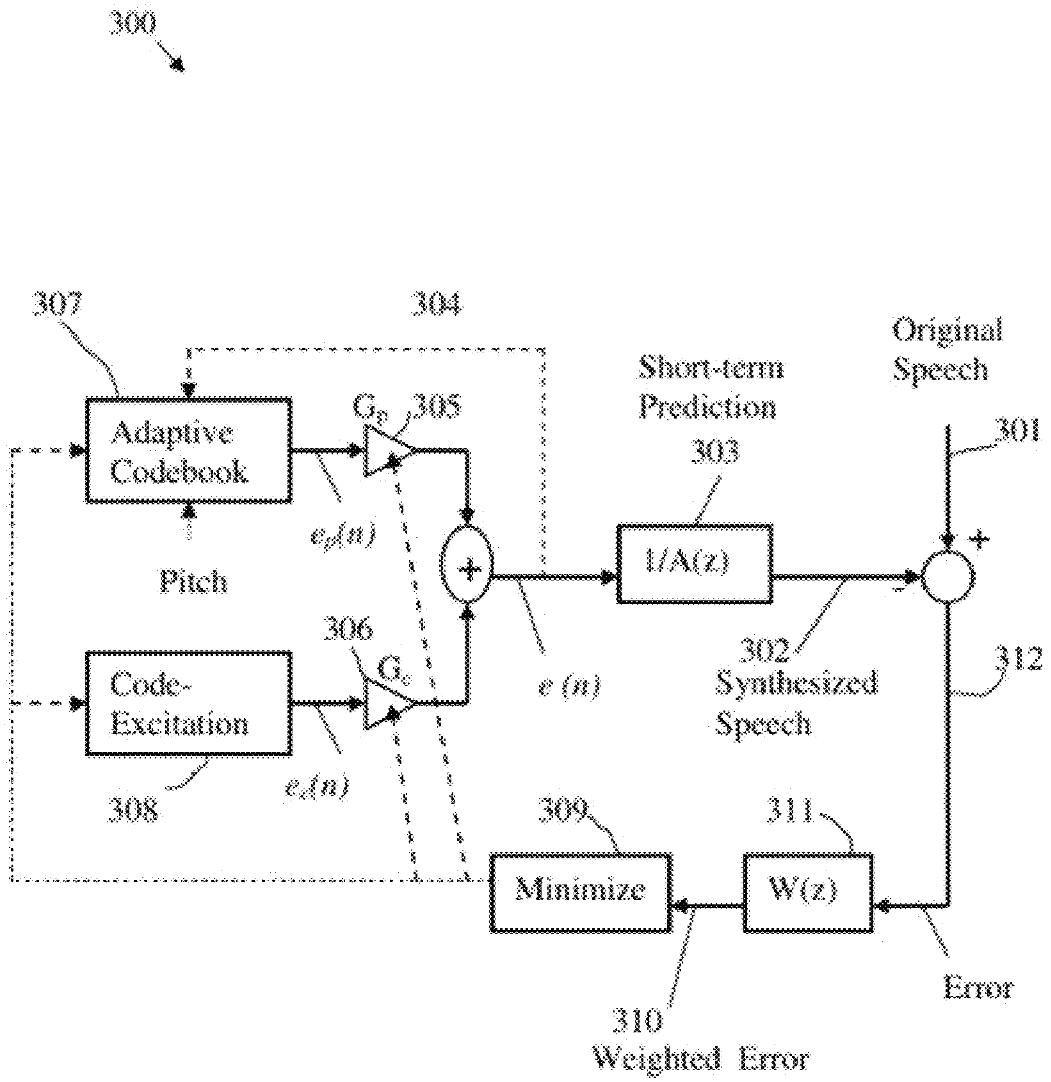
FIG. 3 is a block diagram of another CELP encoder with an adaptive component.

FIG. 3 shows another CELP encoder 300 which implements long-term linear prediction using an adaptive codebook block 307. The adaptive codebook block 307 uses a past synthesized excitation 304 or repeats a past excitation pitch cycle at a pitch period. The remaining blocks and components of the encoder 300 are similar to the blocks and components described above. The encoder 300 can encode a pitch lag in integer value when the pitch lag is relatively large or long. The pitch lag may be encoded in a more precise fractional value when the pitch is relatively small or short. The periodic information of the pitch is used to generate the adaptive component of the excitation (at the adaptive codebook block 307). This excitation component is then scaled by a gain $G_p$ 305 (also called pitch gain). The two scaled excitation components from the adaptive codebook block 307 and the coded excitation block 308 are added together before passing through a short-term linear prediction filter 303. The two gains ($G_p$ and $G_c$) are quantized and then sent to a decoder.

Figure 4:
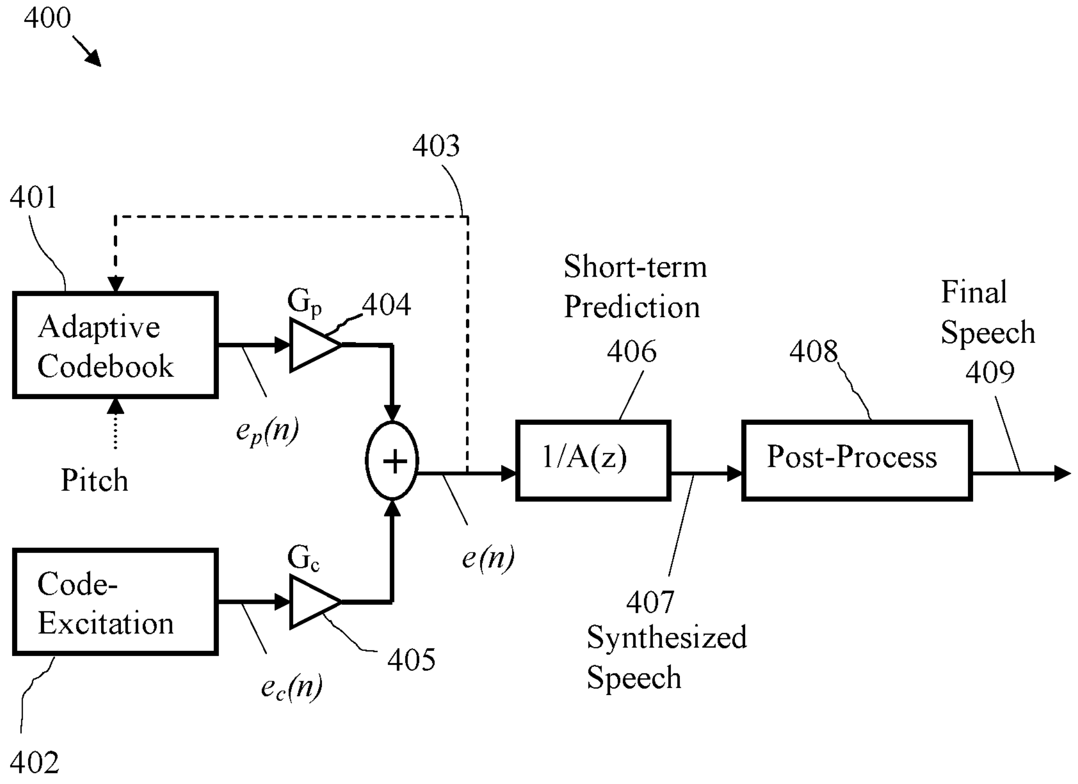
FIG. 4 is a block diagram of another decoder corresponding to the CELP encoder of FIG. 3.

FIG. 4 shows a decoder 400, which may receive signals from the encoder 300. The decoder 400 includes a post-processing block 408 that outputs a synthesized speech signal 407. The decoder 400 is similar to the decoder 200 and the components of the decoder 400 may be similar to the corresponding components of the decoder 200. However, the decoder 400 comprises an adaptive codebook block 307 in addition to a combination of other blocks, including a coded excitation block 402, an adaptive codebook 401, a short-term linear prediction filter 406, and post-processing block 408. The post-processing block 408 may comprise short-term post-processing and long-term post-processing functions. Other blocks are similar to the corresponding components in the decoder 200.

Long-Term Prediction can be effectively used in voiced speech coding due to the relatively strong periodicity nature of voiced speech. The adjacent pitch cycles of voiced speech may be similar to each other, which means mathematically that the pitch gain $G_p$ in the following excitation expression is relatively high or close to 1, $$e(n) = G_p \cdot e_p(n) + G_c \cdot e_c(n) \tag{4}$$

where $e_p(n)$ is one subframe of sample series indexed by n, and sent from the adaptive codebook block 307 or 401 which uses the past synthesized excitation 304 or 403. The parameter $e_p(n)$ may be adaptively low-pass filtered since low frequency area may be more periodic or more harmonic than high frequency area. The parameter $e_c(n)$ is sent from the coded excitation codebook 308 or 402 (also called fixed codebook), which is a current excitation contribution. The parameter $e_c(n)$ may also be enhanced, for example using high pass filtering enhancement, pitch enhancement, dispersion enhancement, formant enhancement, etc. For voiced speech, the contribution of $e_p(n)$ from the adaptive codebook block 307 or 401 may be dominant and the pitch gain $G_p$ 305 or 404 is around a value of 1. The excitation may be updated for each subframe. For example, a typical frame size is about 20 milliseconds and a typical subframe size is about 5 milliseconds.

Figure 5:
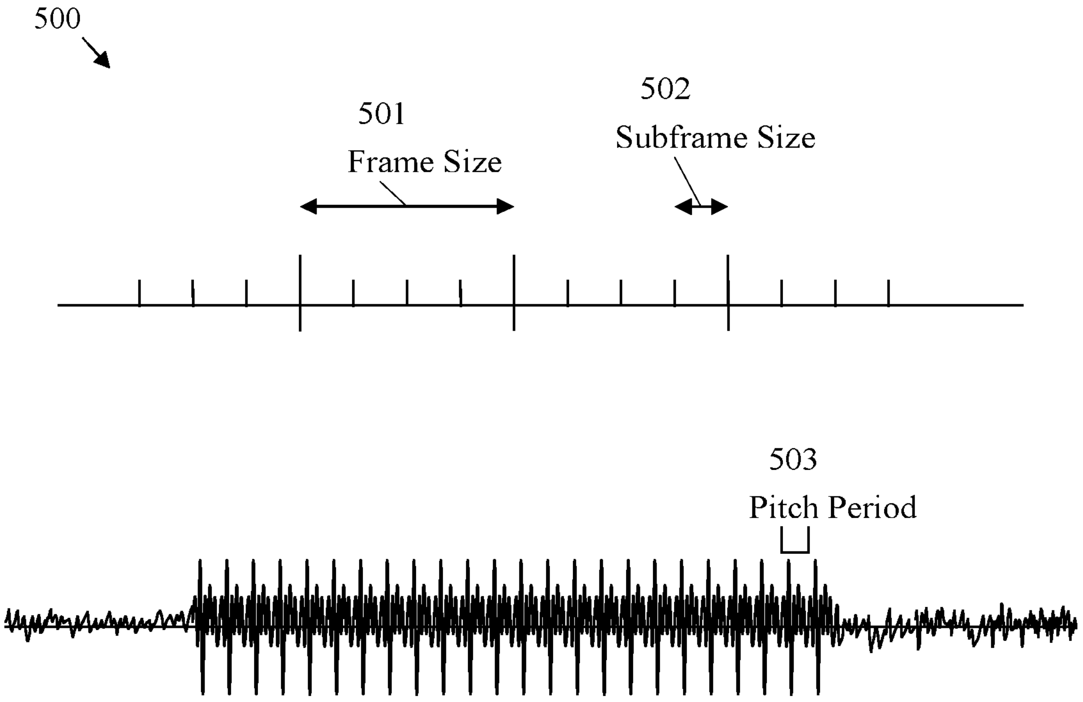
FIG. 5 is an example of a voiced speech signal where a pitch period is smaller than a subframe size and a half frame size.
Figure 6:
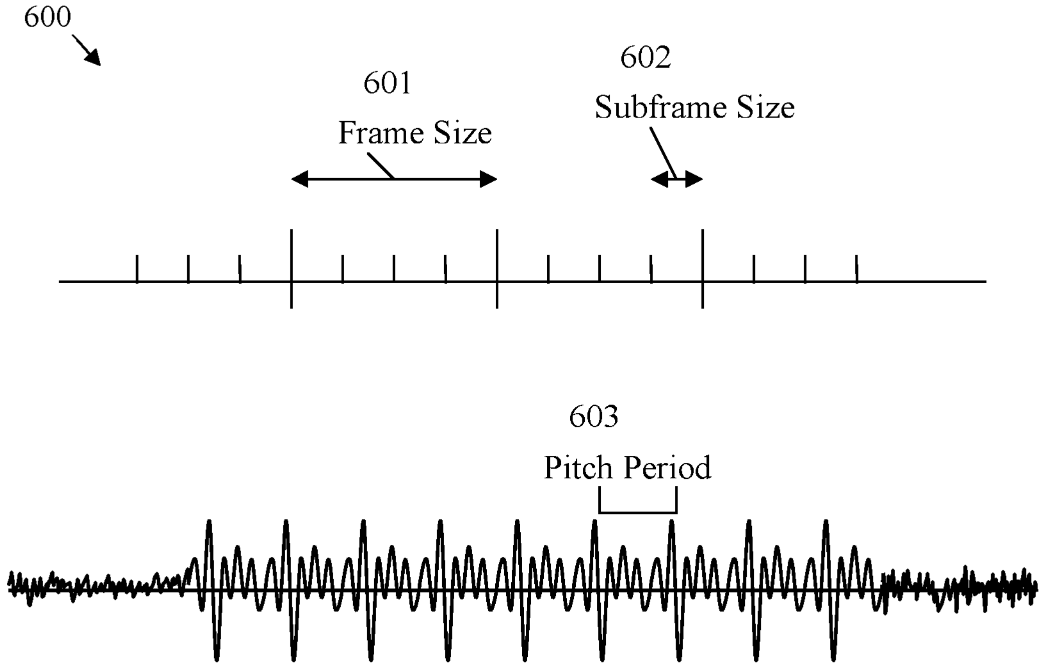
FIG. 6 is an example of a voiced speech signal where a pitch period is larger than a subframe size and smaller than a half frame size.

For typical voiced speech signals, one frame may comprise more than 2 pitch cycles. FIG. 5 shows an example of a voiced speech signal 500, where a pitch period 503 is smaller than a subframe size 502 and a half frame size 501. FIG. 6 shows another example of a voiced speech signal 600, where a pitch period 603 is larger than a subframe size 602 and smaller than a half frame size 601.

The CELP is used to encode speech signal by benefiting from human voice characteristics or human vocal voice production model. The CELP algorithm has been used in various ITU-T, MPEG, 3GPP, and 3GPP2 standards. To encode speech signals more efficiently, speech signals may be classified into different classes, where each class is encoded in a different way. For example, in some standards such as G.718, VMR-WB or AMR-WB, speech signals are classified into UNVOICED, TRANSITION, GENERIC, VOICED, and NOISE classes of speech. For each class, a LPC or STP filter is used to represent a spectral envelope, but the excitation to the LPC filter may be different. UNVOICED and NOISE classes may be coded with a noise excitation and some excitation enhancement. TRANSITION class may be coded with a pulse excitation and some excitation enhancement without using adaptive codebook or LTP. GENERIC class may be coded with a traditional CELP approach, such as Algebraic CELP used in G.729 or AMR-WB, in which one 20 millisecond (ms) frame contains four 5 ms subframes. Both the adaptive codebook excitation component and the fixed codebook excitation component are produced with some excitation enhancement for each subframe. Pitch lags for the adaptive codebook in the first and third subframes are coded in a full range from a minimum pitch limit PIT_MIN to a maximum pitch limit PIT_MAX, and pitch lags for the adaptive codebook in the second and fourth subframes are coded differentially from the previous coded pitch lag. VOICED class may be coded slightly different from GNERIC class, in which the pitch lag in the first subframe is coded in a full range from a minimum pitch limit PIT_MIN to a maximum pitch limit PIT_MAX, and pitch lags in the other subframes are coded differentially from the previous coded pitch lag. For example, assuming an excitation sampling rate of 12.8 kHz, the PIT_MIN value can be 34 and the PIT_MAX value can be 231.

CELP codecs (encoders/decoders) work efficiently for normal speech signals, but low bit rate CELP codecs may fail for music signals and/or singing voice signals. For stable voiced speech signals, the pitch coding approach of VOICED class can provide better performance than the pitch coding approach of GENERIC class by reducing the bit rate to code pitch lags with more differential pitch coding. However, the pitch coding approach of VOICED class or GENERIC class may still have a problem that performance is degraded or is not good enough when the real pitch is substantially or relatively very short, for example, when the real pitch lag is smaller than PIT_MIN. A pitch range from PIT_MIN=34 to PIT_MAX=231 for $F_s$=12.8 kHz sampling frequency may adapt to various human voices. However, the real pitch lag of typical music or singing voiced signals can be substantially shorter than the minimum limitation PIT_MIN=34 defined in the CELP algorithm. When the real pitch lag is P, the corresponding fundamental harmonic frequency is $F0=F_s/P$, where $F_s$ is the sampling frequency and F0 is the location of the first harmonic peak in spectrum. Thus, the minimum pitch limitation PIT_MIN may actually define the maximum fundamental harmonic frequency limitation $F_{MIN}=F_s$/PIT_MIN for the CELP algorithm.

Figure 7:
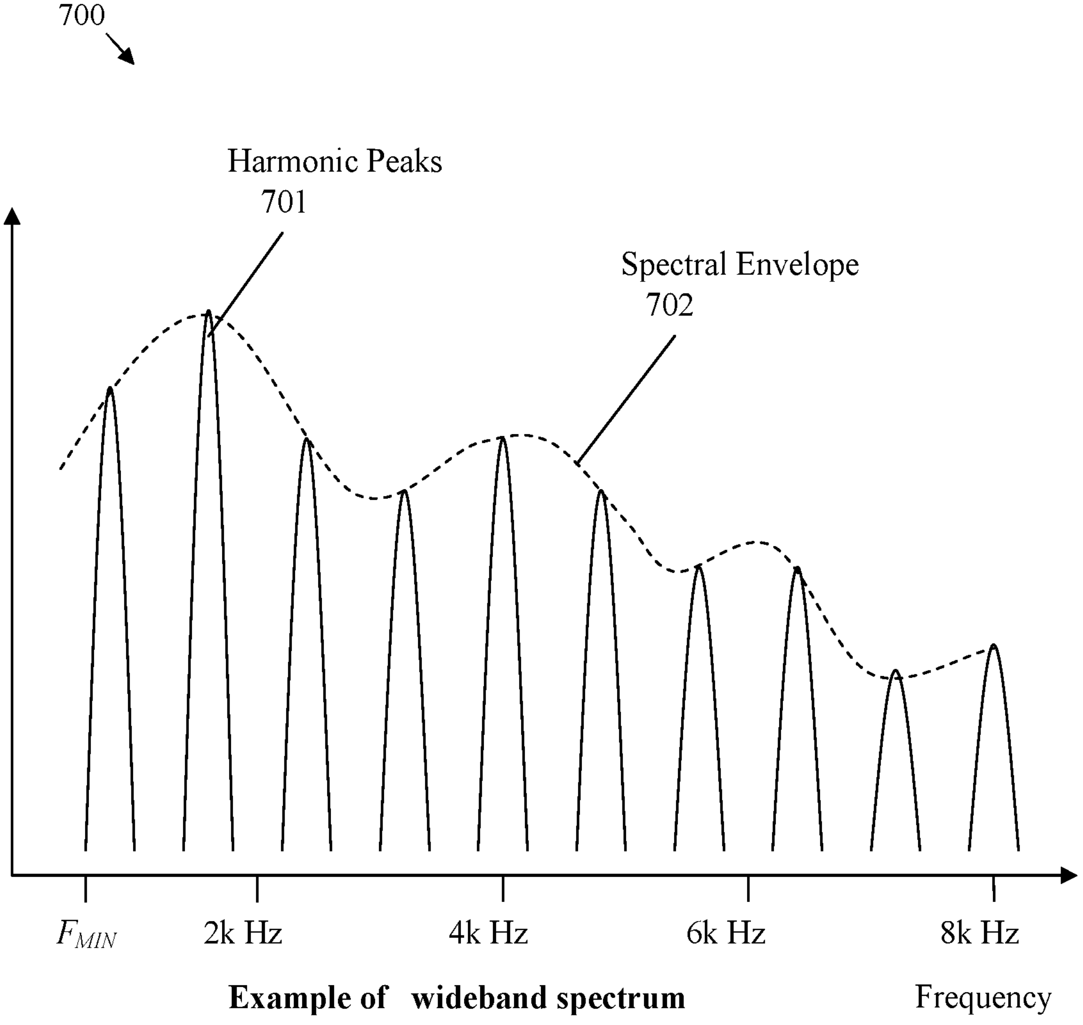
FIG. 7 shows an example of a spectrum of a voiced speech signal.
Figure 8:
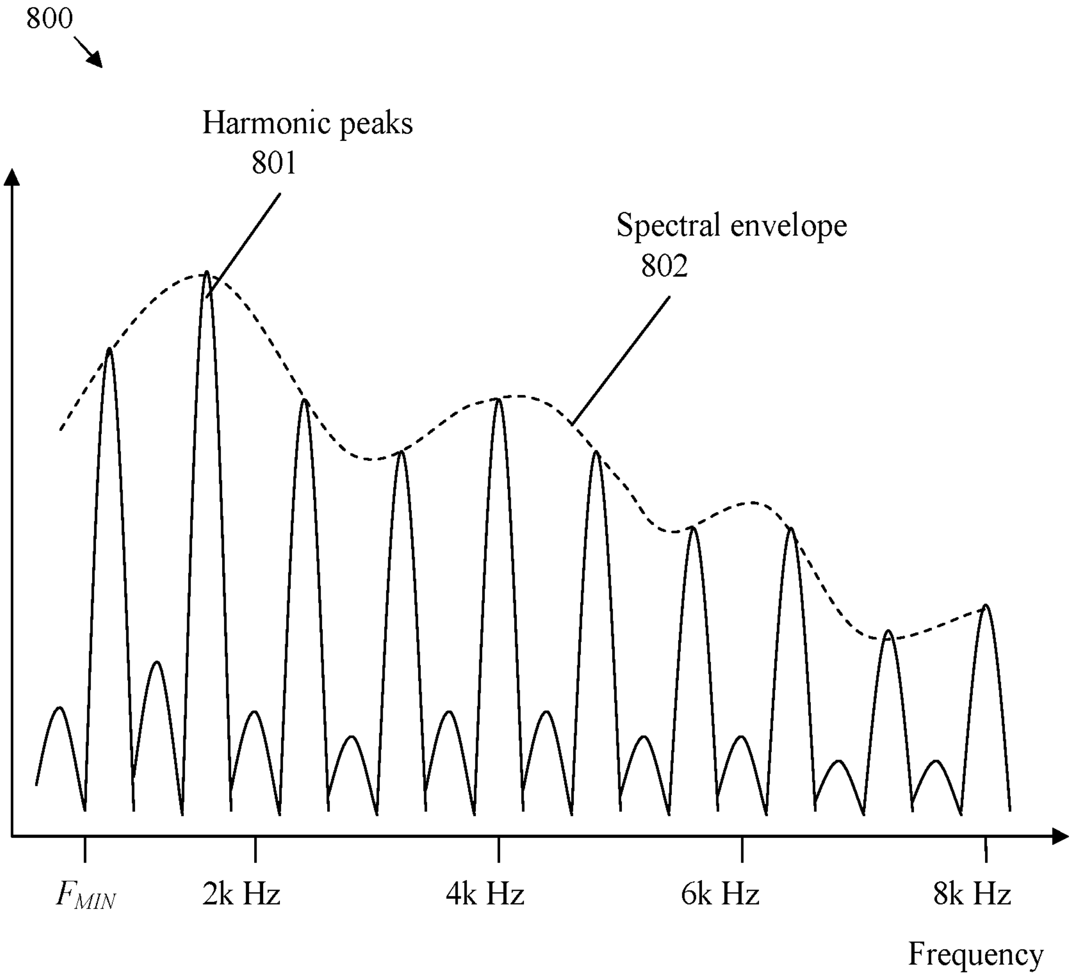
FIG. 8 shows an example of a spectrum of the same signal of FIG. 7 with doubling pitch lag coding.

FIG. 7 shows an example of a spectrum 700 of a voiced speech signal comprising harmonic peaks 701 and a spectral envelope 702. The real fundamental harmonic frequency (the location of the first harmonic peak) is already beyond the maximum fundamental harmonic frequency limitation $F_{MIN}$ such that the transmitted pitch lag for the CELP algorithm is equal to a double or a multiple of the real pitch lag. The wrong pitch lag transmitted as a multiple of the real pitch lag can cause quality degradation. In other words, when the real pitch lag for a harmonic music signal or singing voice signal is smaller than the minimum lag limitation PIT_MIN defined in CELP algorithm, the transmitted lag may be double, triple or multiple of the real pitch lag. FIG. 8 shows an example of a spectrum 800 of the same signal with doubling pitch lag coding (the coded and transmitted pitch lag is double of the real pitch lag). The spectrum 800 comprises harmonic peaks 801, a spectral envelope 802, and unwanted small peaks between the real harmonic peaks. The small spectrum peaks in FIG. 8 may cause uncomfortable perceptual distortion.

System and method embodiments are provided herein to avoid the potential problem above of pitch coding for VOICED class or GENERIC class. The system and method embodiments are configured to code a pitch lag in a range starting from a substantially short value PIT_MIN0 (PIT_MIN0<PIT_MIN), which may be predefined. The system and method include detecting whether there is a very short pitch in a speech or audio signal (e.g., of 4 subframes) using a combination of time domain and frequency domain procedures, e.g., using a pitch correlation function and energy spectrum analysis. Upon detecting the existence of a very short pitch, a suitable very short pitch value in the range from PIT_MIN0 to PIT_MIN may then be determined.

Typically, music harmonic signals or singing voice signals are more stationary than normal speech signals. The pitch lag (or fundamental frequency) of a normal speech signal may keep changing over time. However, the pitch lag (or fundamental frequency) of music signals or singing voice signals may change relatively slowly over relatively long time duration. For substantially short pitch lag, it is useful to have a precise pitch lag for efficient coding purpose. The substantially short pitch lag may change relatively slowly from one subframe to a next subframe. This means that a relatively large dynamic range of pitch coding is not needed when the real pitch lag is substantially short. Accordingly, one pitch coding mode may be configured to define high precision with relatively less dynamic range. This pitch coding mode is used to code substantially or relatively short pitch signals or substantially stable pitch signals having a relatively small pitch difference between a previous subframe and a current subframe.

The substantially short pitch range is defined from PIT_MIN0 to PIT_MIN. For example, at the sampling frequency Fs=12.8 kHz, the definition of the substantially short pitch range can be PIT_MIN0=17 and PIT_MIN=34. When the pitch candidate is substantially short, pitch detection using a time domain only or a frequency domain only approach may not be reliable. In order to reliably detect a short pitch value, three conditions may need to be checked (1) in frequency domain, the energy from 0 Hz to $F_{MIN}=F_s$/PIT_MIN Hz is relatively low enough, (2) in time domain, the maximum pitch correlation in the range from PIT_MIN0 to PIT_MIN is relatively high enough compared to the maximum pitch correlation in the range from PIT_MIN to PIT_MAX, and (3) in time domain, the maximum normalized pitch correlation in the range from PIT_MIN0 to PIT_MIN is high enough toward 1. These three conditions are more important than other conditions, which may also be added, such as Voice Activity Detection and Voiced Classification.

For a pitch candidate P, the normalized pitch correlation may be defined in mathematical form as, $$R(P) = \frac{\sum_n s_w(n) \cdot s_w(n-P)}{\sqrt{\sum_n \|s_w(n)\|^2 \cdot \sum_n \|s_w(n-P)\|^2}}. \quad (5)$$

In (5), $s_w(n)$ is a weighted speech signal, the numerator is correlation, and the denominator is an energy normalization factor. Let Voicing be the average normalized pitch correlation value of the four subframes in the current frame.

$$\text{Voicing} = [R_1(P_1) + R_2(P_2) + R_3(P_3) + R_4(P_4)]/4 \quad (6)$$

where $R_1(P_1)$, $R_2(P_2)$, $R_3(P_3)$, and $R_4(P_4)$ are the four normalized pitch correlations calculated for each subframe, and $P_1$, $P_2$, $P_3$, and $P_4$ for each subframe are the best pitch candidates found in the pitch range from P=PIT_MIN to P=PIT_MAX. The smoothed pitch correlation from previous frame to current frame can be $$\text{Voicing\_sm} \Leftarrow (3 \cdot \text{Voicing\_sm} + \text{Voicing})/4. \quad (7)$$

Using an open-loop pitch detection scheme, the candidate pitch may be multiple-pitch. If the open-loop pitch is the right one, a spectrum peak exists around the corresponding pitch frequency (the fundamental frequency or the first harmonic frequency) and the related spectrum energy is relatively large. Further, the average energy around the corresponding pitch frequency is relatively large. Otherwise, it is possible that a substantially short pitch exits. This step can be combined with a scheme of detecting lack of low frequency energy described below to detect the possible substantially short pitch.

In the scheme for detecting lack of low frequency energy, the maximum energy in the frequency region [0, $F_{MIN}$] (Hz) is defined as Energy0 (dB), the maximum energy in the frequency region [$F_{MIN}$, 900] (Hz) is defined as Energy1 (dB), and the relative energy ratio between Energy0 and Energy1 is defined as $$\text{Ratio} = \text{Energy1} - \text{Energy0}. \quad (8)$$

This energy ratio can be weighted by multiplying an average normalized pitch correlation value Voicing.

$$\text{Ratio} \Leftarrow \text{Ratio} \cdot \text{Voicing}. \quad (9)$$

The reason for doing the weighting in (9) using Voicing factor is that short pitch detection is meaningful for voiced speech or harmonic music, but may not be meaningful for unvoiced speech or non-harmonic music. Before using the Ratio parameter to detect the lack of low frequency energy, it is beneficial to smooth the Ratio parameter in order to reduce the uncertainty.

$$\text{LF\_EnergyRatio\_sm} \Leftarrow (15 \cdot \text{LF\_EnergyRatio\_sm} + \text{Ratio})/16. \quad (10)$$

Let LF_lack_flag=1 designate that the lack of low frequency energy is detected (otherwise LF_lack_flag=0), the value LF_lack_flag can be determined by the following procedure A.

```
If (LF_EnergyRatio_sm>35 or Ratio>50 ) {
   LF_lack_flag=1 ;
}
If (LF_EnergyRatio_sm <16) {
   LF_lack_flag=0 ;
}
```

If the above conditions are not satisfied, LF_lack_flag keeps unchanged.

An initial substantially short pitch candidate Pitch_Tp can be found by maximizing the equation (5) and searching from P=PIT_MIN0 to PIT_MIN, $$R(\text{Pitch\_Tp}) = \text{MAX}\{R(P), P = \text{PIT\_MIN0}, \ldots, \text{PIT\_MIN}\}. \quad (11)$$

If Voicing0 represents the current short pitch correlation, $$\text{Voicing0} = R(\text{Pitch\_Tp}), \quad (12)$$

then the smoothed short pitch correlation from previous frame to current frame can be $$\text{Voicing0\_sm} \Leftarrow (3 \cdot \text{Voicing0\_sm} + \text{Voicing0})/4 \quad (13)$$

Using the available parameters above, the final substantially short pitch lag can be decided with the following procedure B.

```
If ( (coder_type is not UNVOICED or TRANSITION ) and
      (LF_lack_flag=1) and (VAD=1) and
     (Voicing0_sm>0.7) and (Voicing0_sm>0.7 Voicing_sm) )
{
   Open_Loop_Pitch = Pitch_Tp;
   stab_pit_flag = 1;
   coder_type = VOICED;
}
```

In the above procedure, VAD means Voice Activity Detection.

Figure 9:
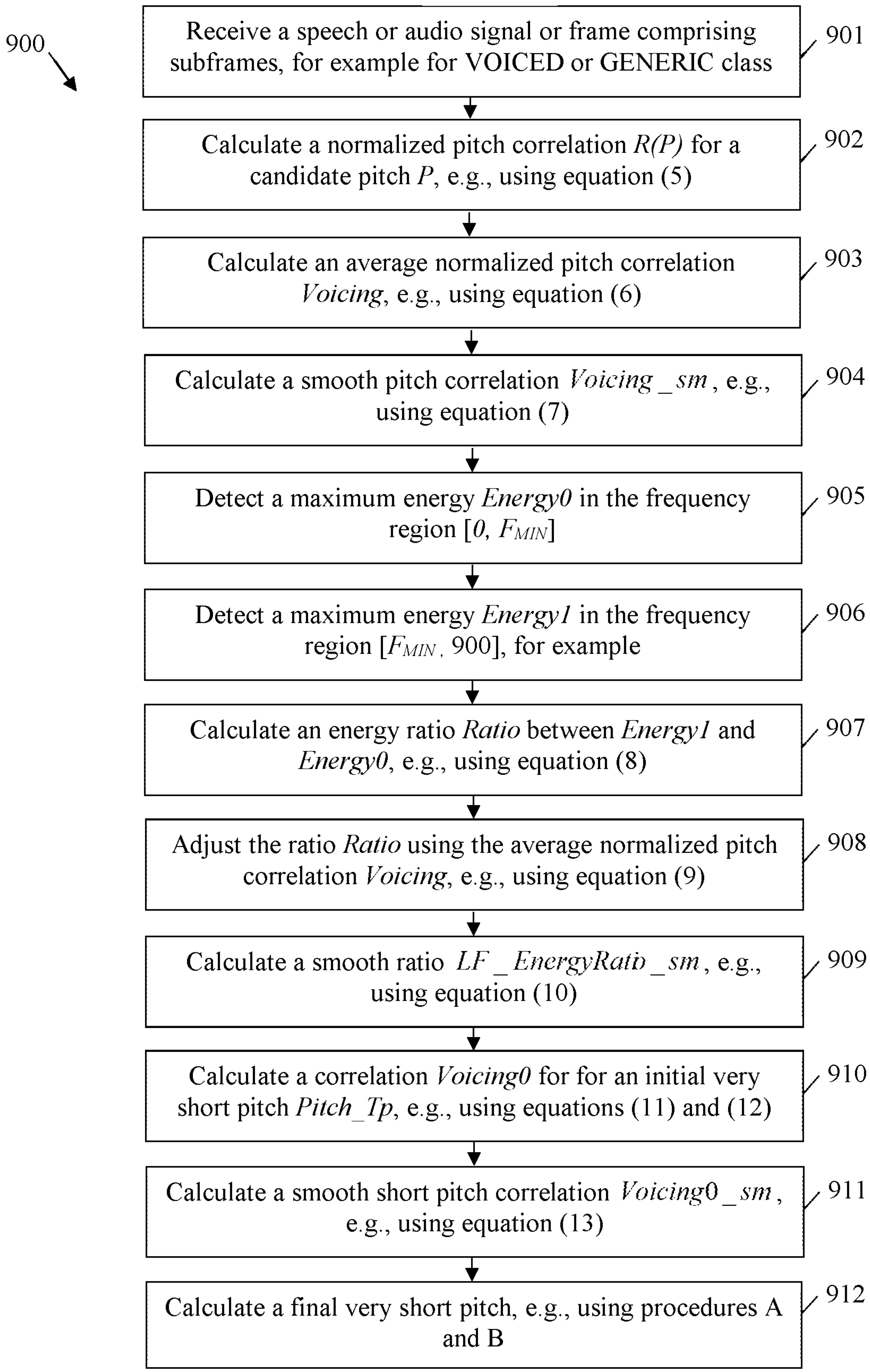
FIG. 9 shows an embodiment method for very short pitch lag detection and coding for a speech or voice signal.

FIG. 9 shows an embodiment method 900 for very short pitch lag detection and coding for a speech or audio signal. The method 900 may be implemented by an encoder for speech/audio coding, such as the encoder 300 (or 100). A similar method may also be implemented by a decoder for speech/audio coding, such as the decoder 400 (or 200). At step 901, a speech or audio signal or frame comprising 4 subframes is classified, for example for VOICED or GENERIC class. At step 902, a normalized pitch correlation R(P) is calculated for a candidate pitch P, e.g., using equation (5). At step 903, an average normalized pitch correlation Voicing is calculated, e.g., using equation (6). At step 904, a smooth pitch correlation Voicing_sm is calculated, e.g., using equation (7). At step 905, a maximum energy Energy0 is detected in the frequency region [0, $F_{MIN}$]. At step 906, a maximum energy Energy1 is detected in the frequency region [$F_{MIN}$, 900], for example. At step 907, an energy ratio Ratio between Energy1 and Energy0 is calculated, e.g., using equation (8). At step 908, the ratio Ratio is adjusted using the average normalized pitch correlation Voicing, e.g., using equation (9). At step 909, a smooth ratio LF_Energy-Ratio_sm is calculated, e.g., using equation (10). At step 910, a correlation Voicing0 for an initial very short pitch Pitch_Tp is calculated, e.g., using equations (11) and (12). At step 911, a smooth short pitch correlation Voicing0_sm is calculated, e.g., using equation (13). At step 912, a final very short pitch is calculated, e.g., using procedures A and B.

Signal to Noise Ratio (SNR) is one of the objective test measuring methods for speech coding. Weighted Segmental SNR (WsegSNR) is another objective test measuring method, which may be slightly closer to real perceptual quality measuring than SNR. A relatively small difference in SNR or WsegSNR may not be audible, while larger differences in SNR or WsegSNR may more or clearly audible. Tables 1 and 2 show the objective test results with/without introducing very short pitch lag coding. The tables show that introducing very short pitch lag coding can significantly improve speech or music coding quality when signal contains real very short pitch lag. Additional listening test results also show that the speech or music quality with real pitch lag<=PIT_MIN is significantly improved after using the steps and methods above.

TABLE 1

SNR for clean speech with real pitch lag <= PIT_MIN.

| | 6.8 kbps | 7.6 kbps | 9.2 kbps | 12.8 kbps | 16 kbps |
|---|---|---|---|---|---|
| No Short Pitch | 5.241 | 5.865 | 6.792 | 7.974 | 9.223 |
| With Short Pitch | 5.732 | 6.424 | 7.272 | 8.332 | 9.481 |
| Difference | 0.491 | 0.559 | 0.480 | 0.358 | 0.258 |

TABLE 2

WsegSNR for clean speech with real pitch lag <= PIT_MIN.

| | 6.8 kbps | 7.6 kbps | 9.2 kbps | 12.8 kbps | 16 kbps |
|---|---|---|---|---|---|
| No Short Pitch | 6.073 | 6.593 | 7.719 | 9.032 | 10.257 |
| With Short Pitch | 6.591 | 7.303 | 8.184 | 9.407 | 10.511 |
| Difference | 0.528 | 0.710 | 0.465 | 0.365 | 0.254 |

Figure 10:
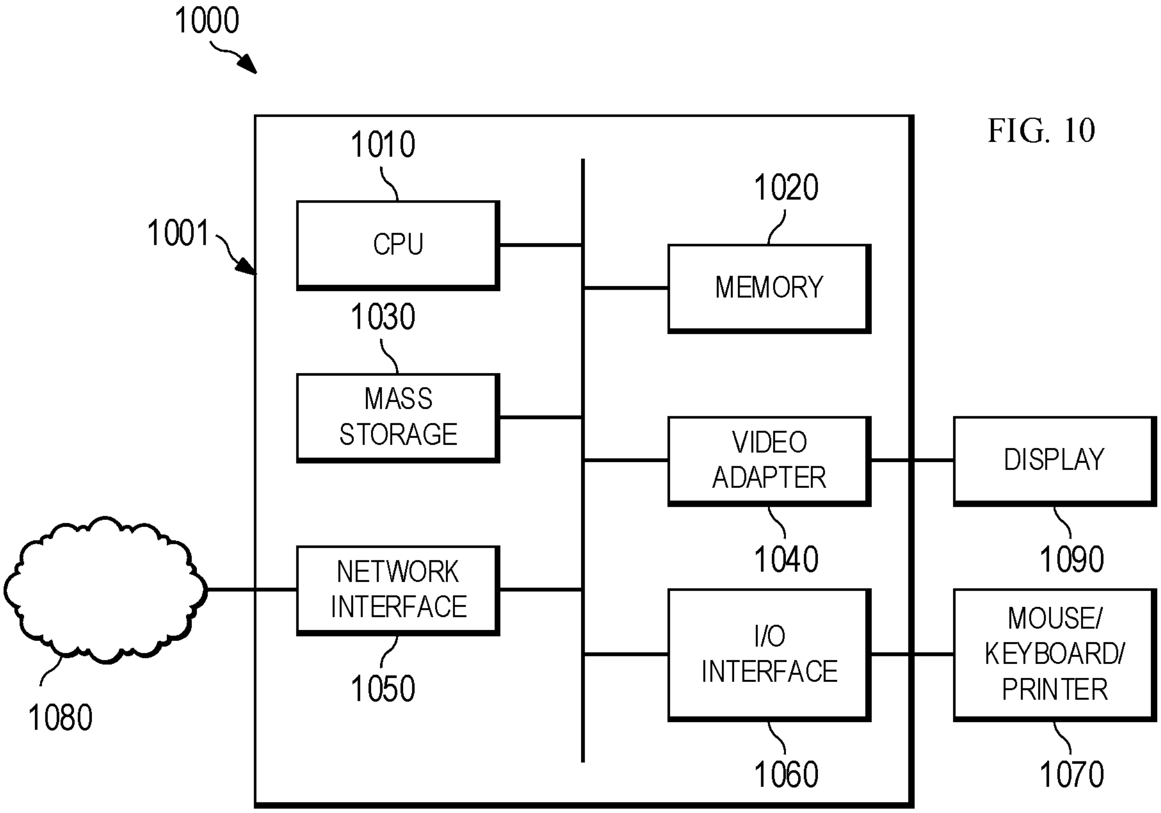
FIG. 10 is a block diagram of a processing system that can be used to implement various embodiments.

FIG. 10 is a block diagram of an apparatus or processing system 1000 that can be used to implement various embodiments. For example, the processing system 1000 may be part of or coupled to a network component, such as a router, a server, or any other suitable network component or apparatus. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a speaker, microphone, mouse, touchscreen, keypad, keyboard, printer, display, and the like. The processing unit 1001 may include a central processing unit (CPU) 1010, a memory 1020, a mass storage device 1030, a video adapter 1040, and an I/O interface 1060 connected to a bus. The bus may be one or more of any type of several bus architectures including a memory bus or memory controller, a peripheral bus, a video bus, or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The video adapter 1040 and the input/output (I/O) interface 1060 provide interfaces to couple external input and output devices to the processing unit. As illustrated, examples of input and output devices include a display 1090 coupled to the video adapter 1040 and any combination of mouse/keyboard/printer 1070 coupled to the I/O interface 1060. Other devices may be coupled to the processing unit 1001, and additional or fewer interface cards may be utilized. For example, a serial interface card (not shown) may be used to provide a serial interface for a printer.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method for pitch detection implemented by an audio signal encoder, wherein the method comprises:

determining a value of an initial pitch lag candidate of a current frame of a signal in a range from a second minimum pitch limitation to a first minimum pitch limitation using a time domain pitch detection technique, wherein a second pitch limitation value of the second minimum pitch limitation is less than a first pitch limitation value of the first minimum pitch limitation, and wherein the signal is a speech signal or an audio signal;

determining whether the current frame lacks low-frequency energy; and determining the initial pitch lag candidate as a final pitch lag when one or more conditions are met, wherein the one or more conditions comprise that the current frame lacks the low-frequency energy.

2. The method of claim 1, wherein determining whether the current frame lacks the low-frequency energy comprises:

determining a first maximum energy of the current frame in a first frequency region from zero to a predetermined minimum frequency;

determining a second maximum energy of the current frame in a second frequency region from the predetermined minimum frequency to a predetermined maximum frequency;

calculating an energy ratio of the current frame between the first maximum energy and the second maximum energy;

adjusting the energy ratio using an average normalized pitch correlation of the current frame to obtain an adjusted energy ratio;

calculating a smoothed energy ratio of the current frame using the adjusted energy ratio; and determining the current frame lacks the low-frequency energy when the smoothed energy ratio of the current frame is greater than a first threshold or the adjusted energy ratio is greater than a second threshold.

3. The method of claim 2, further comprising further calculating the energy ratio according to the following first equation:

$$\text{Ratio}=\text{Energy1}-\text{Energy0},$$

wherein Ratio is the energy ratio, wherein Energy0 is the first maximum energy in decibels (dB) in the first frequency region $[0, F_{MIN}]$, wherein Energy1 is the second maximum energy in dB in the second frequency region $[F_{MIN}, 900]$, wherein $F_{MIN}$ is the predetermined minimum frequency in hertz (Hz), and wherein 900 Hz is the predetermined maximum frequency.

4. The method of claim 3, further comprising further adjusting the energy ratio using the average normalized pitch correlation according to the following second equation:

$$\text{Ratio}\Leftarrow\text{Ratio}\cdot\text{Voicing},$$

wherein Voicing is the average normalized pitch correlation, wherein Ratio on a right side of the second equation is the energy ratio before being adjusted, and wherein Ratio on a left side of the second equation is the adjusted energy ratio.

5. The method of claim 2 further comprising further calculating the smoothed energy ratio of the current frame according to the following first equation:

$$LF_{EnergyRatio_{sm}} \Leftarrow \frac{15 \cdot LF_{EnergyRatio_{sm}} + Ratio}{16},$$

wherein LF_EnergyRatio_sm on a left side of the first equation is the smoothed energy ratio of the current frame, wherein LF_EnergyRatio_sm on a right side of the first equation is the smoothed energy ratio of a previous frame, and wherein Ratio is the adjusted energy ratio.

6. The method of claim 2, further comprising calculating the average normalized pitch correlation according to the following first equation:

$$\text{Voicing}=[R_1(P_1)+R_2(P_2)+R_3(P_3)+R_4(P_4)]/4,$$

wherein Voicing is the average normalized pitch correlation, wherein $R_1(P_1)$, $R_2(P_2)$, $R_3(P_3)$, and $R_4(P_4)$ are four normalized pitch correlations calculated for four subframes of the current frame, wherein $P_1$, $P_2$, $P_3$, and $P_4$ are four pitch candidates found in a pitch range from PIT_MIN to PIT_MAX and respectively corresponding to $R_1(P_1)$, $R_2(P_2)$, $R_3(P_3)$, wherein PIT_MIN is the first minimum pitch limitation, and wherein PIT_MAX is a pitch limitation greater than the first minimum pitch limitation.

7. The method of claim 6, further comprising calculating each of the four normalized pitch correlations according to the following second equation:

$$R(P) = \frac{\sum_n s_w(n) \cdot s_w(n-P)}{\sqrt{\sum_n \|s_w(n)\|^2 \cdot \sum_n \|s_w(n-P)\|^2}},$$

wherein R(P) is a respective one of the four normalized pitch correlations, wherein n is an index, wherein P is a pitch, and wherein $S_w(n)$ is a weighted speech signal.

8. The method of claim 6, further comprising further determining the value of the initial pitch lag candidate according to the following second equation:

$$R(\text{Pitch\_}Tp)=\text{MAX}\{R(P), P=PIT\_\text{MIN0}, \ldots, PIT\_\text{MIN}\}$$

wherein R(Pitch_Tp) is the value of the initial pitch lag candidate, wherein R(P) is a normalized pitch correlation for a pitch lag P, wherein Pitch_Tp is the value of the initial pitch lag candidate, wherein PIT_MIN0 is the second minimum pitch limitation, and wherein PIT_MIN is the first minimum pitch limitation.

9. The method of claim 2, wherein the first threshold is 35 and the second threshold is 50.

10. The method of claim 1, wherein the first minimum pitch limitation is a pitch limitation value defined in a code-excited linear prediction (CELP) algorithm.

11. The method of claim 1, wherein the one or more conditions further comprise that a first smoothed pitch correlation of the initial pitch lag candidate of the current frame is greater than a third threshold.

12. The method of claim 11, further comprising calculating the first smoothed pitch correlation according to the following equation:

$$\text{Voicing0\_}sm\Leftarrow(3\cdot\text{Voicing0\_}sm+\text{Voicing0})/4$$

wherein Voicing0_sm on a left side of the equation is the first smoothed pitch correlation, wherein Voicing0_sm on a right side of the equation is a second smoothed pitch correlation of the initial pitch lag candidate of a previous frame, and wherein Voicing0 is equal to a normalized pitch correlation of the initial pitch lag candidate.

13. The method of claim 11, wherein the one or more conditions further comprise that the first smoothed pitch correlation is greater than a second value of a fourth threshold multiplied by a second smoothed pitch correlation of the current frame.

14. The method of claim 13, further comprising calculating the second smoothed pitch correlation according to the following equation:

$$Voicing\_sm \Leftarrow (3 \cdot Voicing\_sm + Voicing)/4$$

wherein Voicing_sm on a left side of the equation is the second smoothed pitch correlation, wherein Voicing_sm on a right side of the equation is a third smoothed pitch correlation of a previous frame, and wherein Voicing is an average normalized pitch correlation.

15. The method of claim 13, wherein the fourth threshold is 0.7.

16. The method of claim 1, wherein for a 12.8 kilohertz (kHz) sampling frequency, the first pitch limitation value is 34 and the second pitch limitation value is 17.

17. The method of claim 1, further comprising encoding the final pitch lag.

18. An audio signal encoder, comprising:

a memory configured to store program instructions; and one or more processors coupled to the memory and configured to execute the program instructions to cause the audio signal encoder to:

determine a value of an initial pitch lag candidate of a current frame of a signal in a range from a second minimum pitch limitation to a first minimum pitch limitation using a time domain pitch detection technique, wherein a second pitch limitation value of the second minimum pitch limitation is less than a first pitch limitation value of the first minimum pitch limitation, and wherein the signal is a speech signal or an audio signal;

determine whether the current frame lacks low-frequency energy; and determine the initial pitch lag candidate as a final pitch lag when one or more conditions are met, wherein the one or more conditions comprise that the current frame lacks the low-frequency energy.

19. The audio signal encoder of claim 18, wherein the program instructions, when executed by the one or more processors, further cause the audio signal encoder to:

calculate an energy ratio of the current frame according to the following first equation:

$$Ratio = Energy1 - Energy0,$$

wherein Ratio is the energy ratio, wherein Energy0 is a first maximum energy in decibel (dB) in a first frequency region $[0, F_{MIN}]$, wherein Energy1 is a second maximum energy in dB in a second frequency region $[F_{MIN}, 900]$, wherein $F_{MIN}$ is a predetermined minimum frequency in Hertz (Hz), and wherein 900 Hz is a predetermined maximum frequency;

adjust the energy ratio using an average normalized pitch correlation of the current frame to obtain an adjusted energy ratio according to the following second equation:

$$Ratio \Leftarrow Ratio \cdot Voicing,$$

wherein Voicing is the average normalized pitch correlation, wherein Ratio on a right side of the second equation is the energy ratio before being adjusted, and wherein Ratio on a left side of the second equation is the adjusted energy ratio;

calculate a smoothed energy ratio of the current frame using the adjusted energy ratio; and determine the current frame lacks the low-frequency energy when the smoothed energy ratio is greater than a first threshold or the adjusted energy ratio is greater than a second threshold.

20. The audio signal encoder of claim 19, wherein the program instructions, when executed by the one or more processors, further cause the audio signal encoder to:

calculate the smoothed energy ratio according to the adjusted energy ratio according to the following third equation:

$$LF\_EnergyRatio\_sm \Leftarrow (15 \cdot LF\_EnergyRatio\_sm + Ratio)/16,$$

wherein LF_EnergyRatio_sm on a left side of the third equation is the smoothed energy ratio of the current frame, wherein LF_EnergyRatio_sm on a right side of the third equation is the smoothed energy ratio of a previous frame, and wherein Ratio is the adjusted energy ratio;

calculate the average normalized pitch correlation according to the following fourth equation:

$$Voicing = [R_1(P_1) + R_2(P_2) + R_3(P_3) + R_4(P_4)]/4,$$

wherein Voicing is the average normalized pitch correlation, $R_1(P_1)$, $R_2(P_2)$, $R_3(P_3)$, wherein $R_4(P_4)$ are four normalized pitch correlations for four subframes of the current frame, wherein $P_1$, $P_2$, $P_3$, and $P_4$ are four pitch candidates found in a pitch range from PIT_MIN to PIT_MAX and respectively corresponding to $R_1(P_1)$, $R_2(P_2)$, $R_3(P_3)$, wherein PIT_MIN is the first minimum pitch limitation, and wherein PIT_MAX is a pitch limitation greater than the first minimum pitch limitation;

determine the value of the initial pitch lag candidate is according to the following fifth equation:

$$R(Pitch\_Tp) = MAX\{R(P), P = PIT\_MIN0, \ldots, PIT\_MIN\},$$

wherein R(Pitch_Tp) is the value of the initial pitch lag candidate, wherein R(P) is a normalized pitch correlation for a pitch lag P, Pitch_Tp is the value of the initial pitch lag candidate, wherein PIT_MIN0 is the second minimum pitch limitation, and wherein PIT_MIN is the first minimum pitch limitation, and wherein the one or more conditions further comprise a first smoothed pitch correlation of the initial pitch lag candidate of the current frame is greater than a third threshold and the first smoothed pitch correlation is greater than a second value of a fourth threshold multiplied by a third smoothed pitch correlation of the current frame;

calculate the first smooth pitch correlation according to the following sixth equation:

$$Voicing\ 0\_sm \Leftarrow (3 \cdot Voicing\ 0\_sm + Voicing\ 0)/4$$

wherein Voicing0_sm on a left side of the sixth equation is the first smoothed pitch correlation, wherein Voicing0_sm on a right side of the sixth equation is a second smoothed pitch correlation of the initial pitch lag candidate of the previous frame, and wherein Voicing0 is equal to a normalized pitch correlation of the initial pitch lag candidate; and calculate the third smoothed pitch correlation according to the following seventh equation:

$$Voicing\_sm \Leftarrow (3 \cdot Voicing\_sm + Voicing)/4$$

wherein Voicing_sm on a left side of the seventh equation is the third smoothed pitch correlation, wherein Voicing_sm on a right side of the seventh equation is a fourth smoothed pitch correlation of the previous frame, and wherein Voicing is the average normalized pitch correlation.

21. A computer program product comprising instructions that are stored on a computer-readable medium and that, when executed by one or more processors, cause an audio signal encoder to be configured to:

determine a value of an initial pitch lag candidate of a current frame of a signal in a range from a second minimum pitch limitation to a first minimum pitch limitation using a time domain pitch detection technique, wherein a second pitch limitation value of the second minimum pitch limitation is less than a first pitch limitation value of the first minimum pitch limitation, and wherein the signal is a speech signal or an audio signal;

determine whether the current frame lacks low-frequency energy; and determine the initial pitch lag candidate as a final pitch lag when one or more conditions are met, wherein the one or more conditions comprise that the current frame lacks the low-frequency energy.

* * * * *